United States Patent
Luis Pinter et al.

(10) Patent No.: US 11,955,867 B2
(45) Date of Patent: Apr. 9, 2024

(54) LIFTABLE BRUSH HOLDER SYSTEM ABLE TO OPERATE STATICALLY AND CORRESPONDING ROTARY ELECTRIC MACHINE

(71) Applicant: WEG EQUIPAMENTOS ELETRICOS S.A., Jaraguá do Sul (BR)

(72) Inventors: Cesar Luis Pinter, Jaragua do Sul (BR); Nilson Sacht, Jaragua do Sul (BR); Alini Emmanuele Gracinski, Jaragua do Sul (BR)

(73) Assignee: WEG EQUIPAMENTOS ELETRICOS S.A., Jaraguá do Sul (BR)

( * ) Notice: Subject to any disclaimer, the term of this patent is extended or adjusted under 35 U.S.C. 154(b) by 223 days.

(21) Appl. No.: 17/595,558

(22) PCT Filed: May 22, 2019

(86) PCT No.: PCT/BR2019/050187
§ 371 (c)(1),
(2) Date: Nov. 18, 2021

(87) PCT Pub. No.: WO2020/232516
PCT Pub. Date: Nov. 26, 2020

(65) Prior Publication Data
US 2022/0247256 A1     Aug. 4, 2022

(51) Int. Cl.
*H02K 5/14*     (2006.01)
(52) U.S. Cl.
CPC ..................................... *H02K 5/14* (2013.01)

(58) Field of Classification Search
CPC ......... H02K 5/14; H02K 13/003; H01R 39/42
See application file for complete search history.

(56) References Cited

U.S. PATENT DOCUMENTS

| 1,392,193 A | 9/1921 | Mills | |
| 2,016,173 A * | 10/1935 | Charles, I | H02K 23/66 |
| | | | 310/240 |
| 8,558,429 B2 | 10/2013 | Toledo et al. | |
| 8,674,581 B2 | 3/2014 | Toledo et al. | |

FOREIGN PATENT DOCUMENTS

| EP | 0858148 B1 | 4/2005 |
| JP | S50151308 A * | 12/1975 |
| JP | H04308677 A * | 10/1992 |

OTHER PUBLICATIONS

JPS50151308A_translate (Year: 1975).*
JPH04308677A_translate (Year: 1992).*
International Search Report regarding International Application No. PCT/BR2019/050187, dated Sep. 9, 2019, 2 pages.

* cited by examiner

*Primary Examiner* — Tulsidas C Patel
*Assistant Examiner* — Mohammed Ahmed Qureshi
(74) *Attorney, Agent, or Firm* — Knobbe, Martens, Olson & Bear, LLP

(57) ABSTRACT

The present invention refers to a liftable brush holder system (9) able to operate as fixed, comprising a motor (1) that drives a speed reducer (2) that drives a shaft (3) that moves a disc with eccentric slot (4), wherein the disk with eccentric slot (4) closes the short-circuit bushing (6) and independently moves the sides (9r, 9l) of the brush holder (9). The present invention further refers to a rotating electric machine equipped with a system according to the invention.

17 Claims, 8 Drawing Sheets

STATE OF THE ART

STATE OF THE ART

STATE OF THE ART

STATE OF THE ART

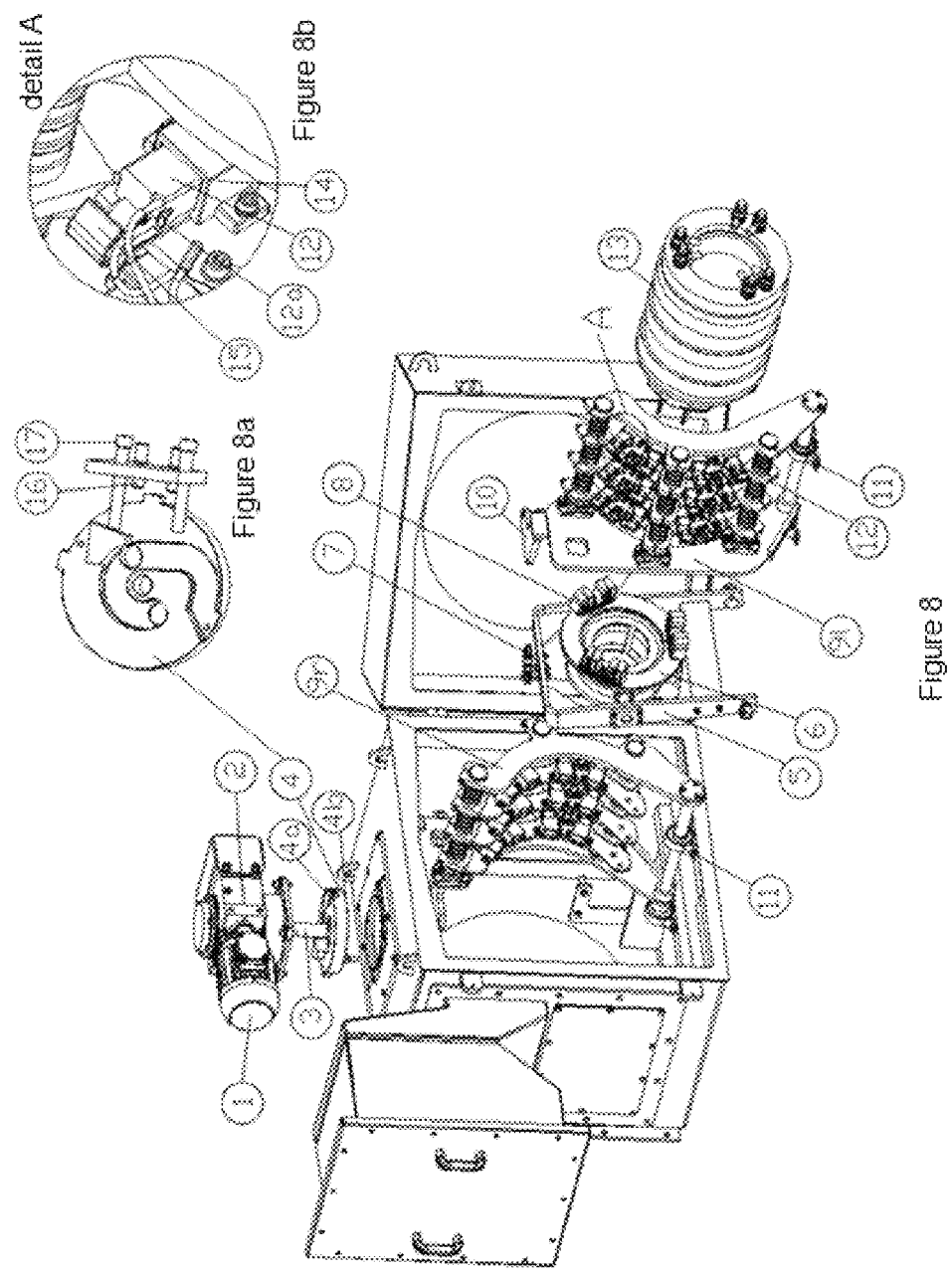

LIFTABLE BRUSH HOLDER SYSTEM ABLE TO OPERATE STATICALLY AND CORRESPONDING ROTARY ELECTRIC MACHINE

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

FIELD OF APPLICATION

The present invention belongs to the field of brush holder systems applied to three-phase alternating current motors, in particular to liftable brush systems and fixed brush systems, notably to the elements that constitute such systems.

BACKGROUND OF THE INVENTION

Brush holders, together with slip rings, are applied to three-phase alternating current motors, commercially known as slip ring motors or wound rotor motors. They are normally used in applications that require high starting torque or in cases where there is a limitation of the starting current in the supply system. For applications that present variable torque during operation, the motor is equipped with a fixed brush holder system, whereas in applications that require high torque only for starting, the motor is equipped with a liftable brush holder system.

In both systems there is the brush holder and slip ring set, which is responsible for linking the static part (rheostat) with the rotating part (rotor), the connection being made through the carbon brush.

PRIOR ART

Currently, there are motors on the market with two types of brush system, which can be fixed brushes or liftable brushes.

The fixed brush system is one in which the brushes remain in contact with the slip ring permanently under pressure by constant pressure springs. In this case, the brushes have a limited useful life (from 6 to 8 months) due to wear caused by the permanent contact of the brushes with the slip ring, thus representing an important disadvantage in terms of operating, material, and maintenance costs, as it demands periodically changing the brushes and cleaning the interior of the compartment that houses them, to eliminate dust from their wear.

The liftable brush system, on the other hand, is applied, for example, to motors that need high torque only for starting, wherein the brush application time is of a few seconds and, the rest of the time, the motors run as squirrel cage motors. The lifting system, in this case, is driven by means of a motorized device responsible for both brush lifting and short-circuit closing. When the motor reaches rated speed, the lifting system is driven, acting as follows: the lifting system is driven by a motor that, through a reducer, drives a shaft that moves an eccentric disc. This eccentric disc allows the system to perform both brush lifting and short-circuit closing. When the eccentric disk is moved, the arm is moved by the component, making the closing movement of the short-circuit bushing. After closing the short circuit, the brush lifting system is moved by the eccentric disc, but through the lifting ring, which will lift the brushes. When the brushes are lifted, they lose contact with the slip ring, preventing wear. In this type of solution, the brushes have a useful life of approximately 10 years and need cleaning at longer intervals, for example, every 6 months.

The disadvantage of such a liftable brush system found on the market, however, is that it does not allow the work as a fixed brush system, since they use variable pressure springs. In the case of variable pressure springs, the pressure varies according to the elongation of the spring, which cannot occur in a fixed brushes system, in which the spring pressure control on the brush is fundamental for its performance and pressure variations must not be above 15% between brushes of the same phase. In addition, the state of the art does not foresee the possibility of variation in the number of brushes, much less that it occurs remotely, according to the load conditions of the motor operation.

An example of prior art liftable brush systems in the nature discussed herein is US Patent Document No. US20120169178, which discloses and describes systems, methods, and devices for short-circuit slip rings of induction motors. Said system comprises a shaft in operational communication with an induction motor shaft, several slip rings radially positioned around the shaft and in electrical communication with the rotor windings, in addition to multiple brushes adapted for selective contact with one or more of the slip rings. In addition, the system may include multiple selective activation electrical contacts in electrical communication with the respective motor rotor winding terminals and a drive mechanism in operational communication with the brushes and the electrical contacts.

According to the aforementioned document US20120169178, the eccentric slot (160) serves as a positioner for the complete set (it is impossible to use only one side of the structure, that is, it is impossible to vary the number of brushes in action, much less remotely) in addition to lifting the brushes (130), however, the system works with independent mechanisms connected by current, where loss of connection may happen, either by detachment or breakage of the current. Apparently, the system does not have sensors to indicate each independent mechanical part, being possible to generate failure in the operation. Operation in fixed mode is not possible either due to the use of the concept of variable pressure springs (320) in the system.

Therefore, it is concluded that currently the market lacks the option of a motor equipped with both brush systems (liftable and fixed) and that allows the user/customer to purchase a single reserve motor for two different applications. For this reason, with the options presented above, it is necessary to purchase two motors, each equipped with a different type of brush system. Furthermore, it is impossible to vary the number of brushes in action in the same fixed brush system.

Therefore, as can be inferred from the above description, there is room for a liftable brush system that works with a constant pressure spring and that allows the use as a fixed brush system, overcoming the disadvantages of the prior art of conventional lifting systems.

SUMMARY OF THE INVENTION

One of the objects of the present invention is, therefore, to provide a brush lifting system that overcomes the deficiencies of the prior art, in particular, providing a solution (i) of simplified construction and reduced number of components, (ii) that enables the operation with only one side of the brush holder, optimizing compartment cleaning time and material consumption; (iii) able to provide the customer with the option of obtaining only one spare motor for two different applications; (iv) which enables the operation of the motor with a fixed system, in case of failure of any component of the lifting system; and enables the operation as fixed brushes with the possibility of remote brush variation.

Another objective of the present invention is to provide a rotating electrical machine equipped with a corresponding brush lifting system.

BRIEF DESCRIPTION OF THE FIGURES

For better understanding and visualization of the object of the present invention, the same will now be described with reference to the attached drawings, representing the technical effect obtained by means of an exemplary embodiment not limiting the scope of the present invention, wherein, schematically:

FIG. 8 shows an isometric perspective view of a system according to the invention;

FIG. 8a shows an enlarged view of the disc with eccentric slot, the inductive sensor, and the mechanical stop of FIG. 8; and FIG. 8b shows an enlarged view of detail A in FIG. 8.

DETAILED DESCRIPTION OF THE INVENTION

Figure 1:
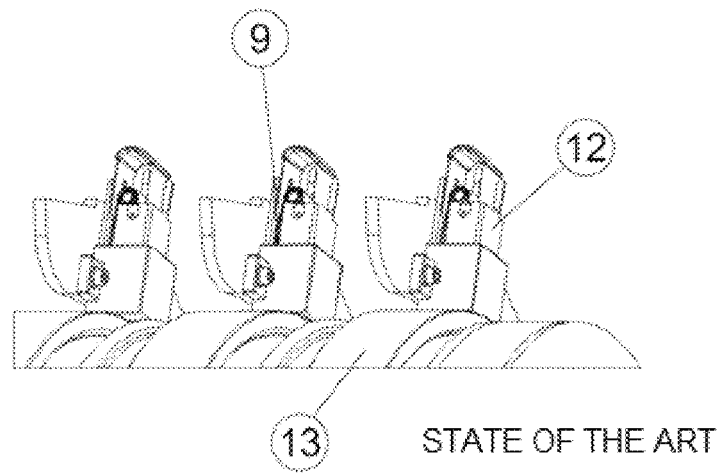
FIG. 1 shows a view of the connection between static part and rotating part of a prior art brush system.
Figure 2:
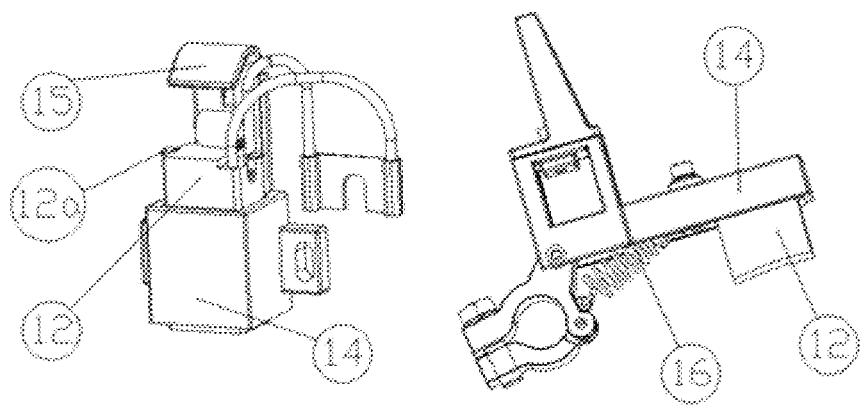
FIG. 2 shows a front view of the constant pressure spring and a side view of the variable pressure spring of a prior art brush system.
Figure 3:
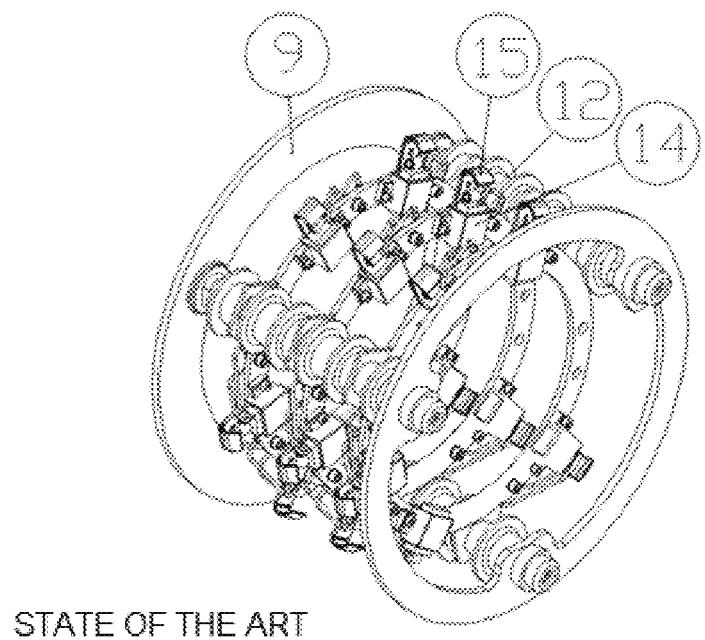
FIG. 3 shows a view of a fixed brush holder system, with constant pressure springs of a prior art brush system.
Figure 4:
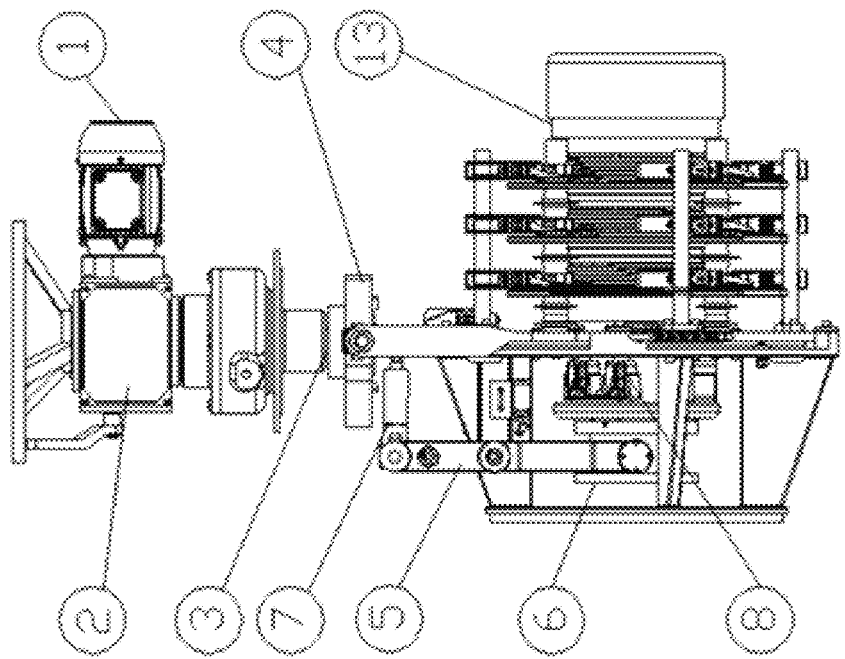
FIG. 4 shows front and side views of the typical variable pressure spring lifting system design of a prior art brush system.
Figure 4:
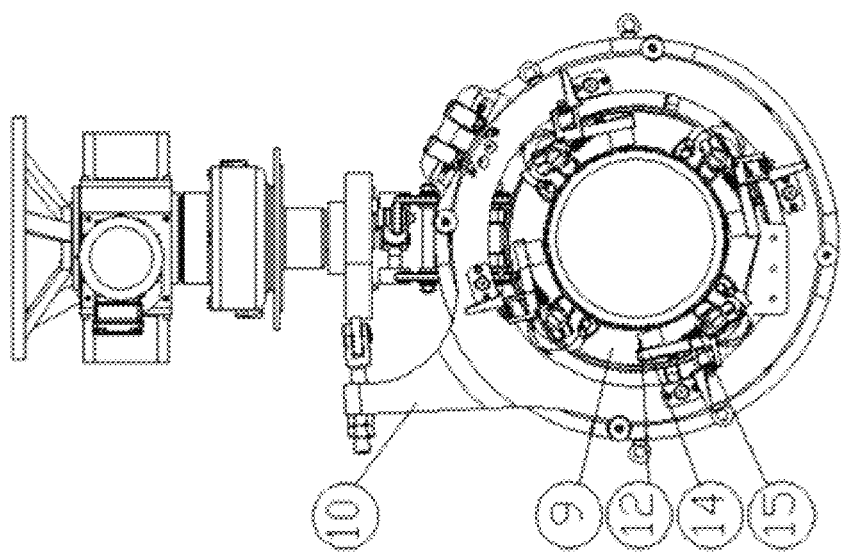
Figure 5:
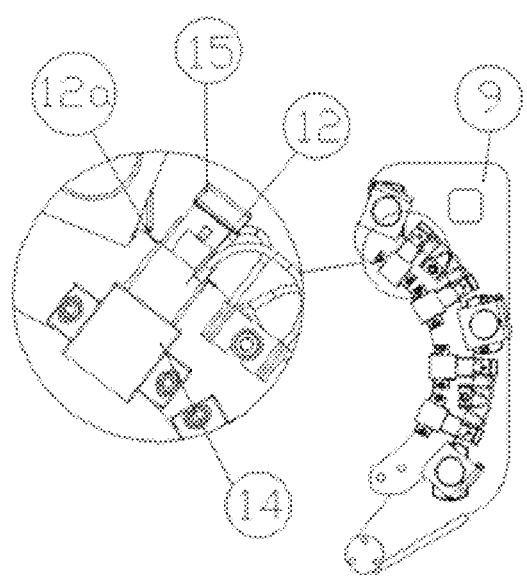
FIG. 5 shows a front view of an enlarged detail of the lifting system with constant pressure spring according to the invention.
Figure 6:
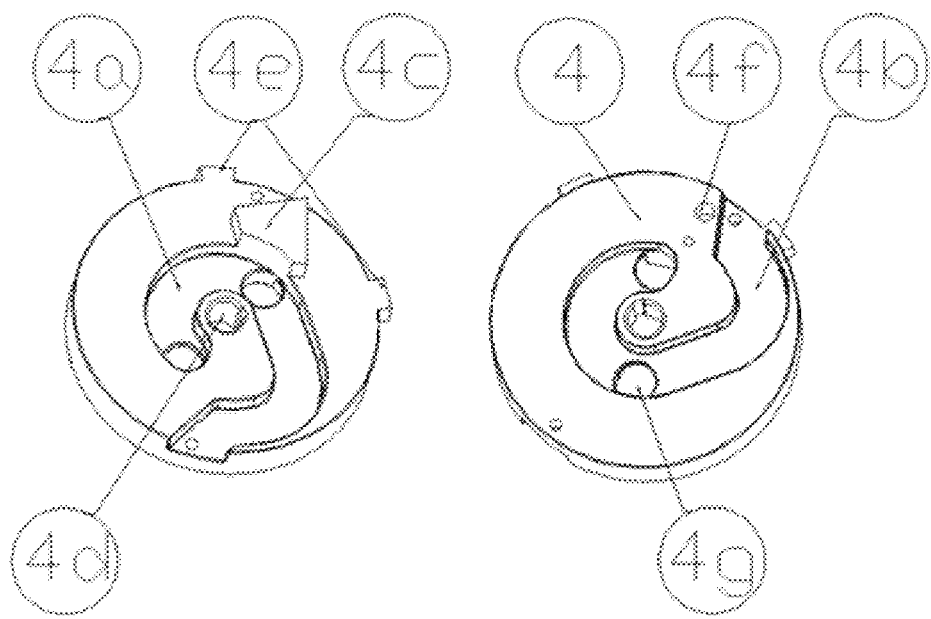
FIG. 6 shows an upper side view and an underside view of the lifting disc with eccentric slot according to the invention.
Figure 7:
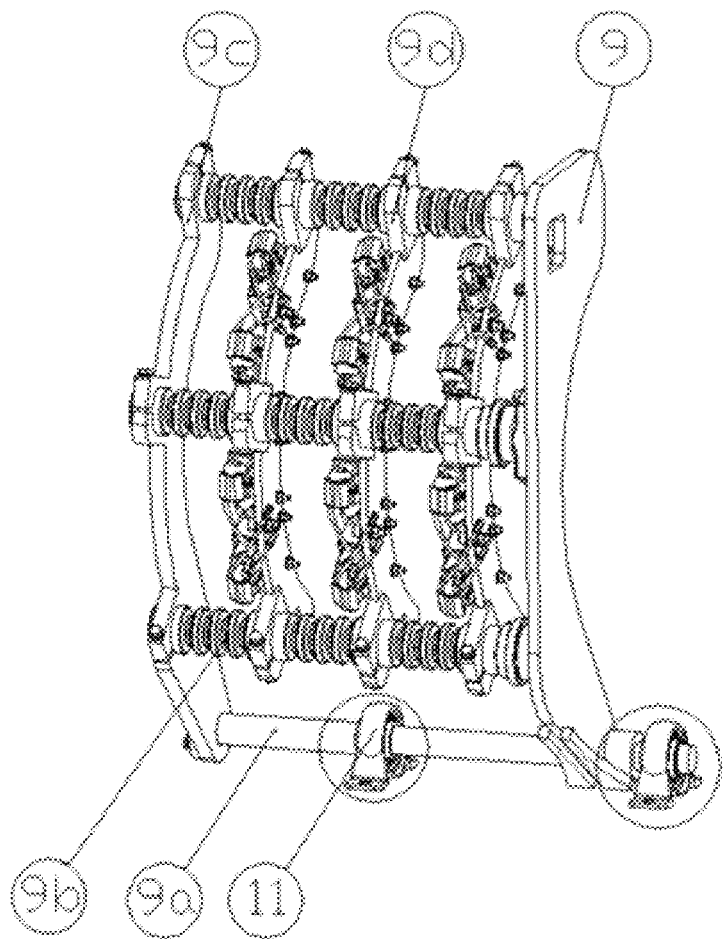
FIG. 7 shows an isometric view of a system according to the invention, showing a bearing unit for articulating the brush holder.

The present invention refers to a liftable brush holder system able to function as fixed. It consists of a motor (1) that drives a speed reducer (2), this driving a shaft (3) that moves a disc with eccentric slot (4).

The disc with eccentric slot (4) is responsible for moving both sides of the brush holder (9) independently and by the closing the short-circuit bushing (6).

The disc with eccentric slot (4) has two slots (4a, 4b), arranged on opposite sides of the disc with eccentric slot (4) and offset by 160° to 200°, preferably by 180°, having eccentricity in the slot (4a, 4b) of 48 mm between the inner radius and the outer radius, with 60% of the movement being carried out in the inner radius and 30% between the path between the inner/outer radius and 10% in the outer radius, in order to ensure that the short-circuit system (8) remains closed when lowering or lifting the brushes (12), in addition to having a working angle of 220° to 300°, preferably 260° between the same lowering and lifting of the brushes (12), the left side brush holder (9l) being connected in the upper slot (4a) and the right side brush holder (9r) being connected to the bottom slot (4b), and in some cases only one arm (9r or 9l) can be connected to the disc with eccentric slot (4), either by the presence of only one arm (9r or 9l) in the lifting system or as a way of varying the number of brushes (12) in the fixed system, where two arms (9r and 9l) are present, but only one connected to the disc with eccentric slot (4).

The disc with eccentric slot (4) has two drain points (4g) to purge any unwanted material that may deposit in the eccentric slot (4a, 4b).

In addition to the features mentioned above, the eccentric disc (4) has two protrusions (4e) that have the function of driving the inductive sensors (16) which, in turn, indicate the end of the lowering or lifting stroke of the brushes (12), sending a signal to the external panel for motor shutdown (1). In case the system is blocked in the middle of the course and the end-of-stroke sensors are not driven, an external protection to the system switches off the same motor through a timer or motor circuit breaker. In addition to the sensors, there is a mechanical end-of-stroke system (4c) present only at the top of the disc with eccentric slot (4) which, together with the mechanical stop screws (17), has the function of stopping the system in case of failure of inductive sensors (16).

The disc with eccentric slot (4) is driven through the fixing location of the drive shaft (4d) and the drive shaft (3). The disc with eccentric slot (4) has a place for fixing the intermediate shaft (40 which has the function of moving the bushing movement arm (5) and, consequently, the short-circuit contact (8).

For lifting the brushes (12), one side of the brush holder (9) is connected by means of the intermediate arm (10) to the upper eccentric slot (4a) and the other side of the brush holder (9) is connected to the lower eccentric slot (4b) of the disc with eccentric slot (4).

In order to move the short-circuit bushing (6), the intermediate shaft (7) is connected to the disc with eccentric slot (4), and the intermediate shaft (7) is connected to the moving arm (5) of the short-circuit bushing (6), moving it. Then, when the disc with eccentric slot (4) rotates, the closing movement of the short-circuit bushing (6) and then the lifting of the brushes (12) are carried out, in that order. The bearing units (11) present at the base on each side of the brush holder (9) allow the system to be safely articulated during the rotation of the disc with eccentric slot (4).

Because each side of the brush holder (9) is connected to the disc with eccentric slot (4) in different positions and the articulation of the bearing units (11) on each side is independent, it is possible to use only one side of the brush holder (9) when the system requires half or less of the rated capacity of brushes of each system size, without prejudice to its functioning.

For this system to operate correctly, the brushes (12) must have a stop (12a), so that, when the brushes (12) are lifted, they touch the brush holder (14) and do not remain in contact with the slip ring (13).

In this type of solution, operating with the lifting system according to the invention, the brushes (12) have a useful life of approximately 10 years.

For the system to operate as a fixed brush holder, it is not necessary any intervention in the system, just keep the brushes in contact with the slip ring and deactivate the driving system.

The constant pressure spring (15) and brush (12) set will ensure the correct performance of the brushes (12). When the system works with the brushes (12) down, the short-circuit bushing (6) will be open during the entire motor operation.

That said, the important advantage that the present invention brings in relation to the state of the art remains evident, namely: that of providing a brush holder lifting system (9) equipped with a constant pressure spring (15) and able to work as a fixed brush holder system (9). In this sense, the creation of the concept using constant pressure springs (15) in the lifting system, the lifting disc (4) with eccentric slot (4a/4a) and the articulation shape of the brush holder (11) are fundamental for enabling the operation with fixed brushes (12), wherein the disc with eccentric slot (4) allows the lifting of the brushes (12) and also maintains the position when the brushes (12) are in the condition of contact with the slip ring (13) (fixed brushes).

In addition, the skilled person will understand that this concept creates a new product option available on the market, which has not been evidenced so far.

All the connections between the elements are mechanical and centered on the disc with eccentric slot (4), where the two sides of the brush holder (9) are independently connected, and only one half of the system can be used, the right side being connected to the lower part of the cam (4b) and the left side connected to the upper part (4a), in addition to the connection through the intermediate arm (7) with the movement arm of the short bushing (5), without the presence of pulleys or chains, each independent mechanical set being monitored by a pair of inductive sensors (totaling 8 internal sensors) that assess the correct positioning of each mechanism in addition to, in conjunction with a spring system with constant pressure (15), being able to operate both with a liftable system and as a fixed system. Another innovative element, for operation in fixed mode, is the possibility of operating the system with one moving arm and the other fixed arm, then being possible to vary the number of brushes (9) according to the load which the motor (1) is remotely operating with, ensuring the best performance of brushes (9) and slip rings (13). This artifice enables to increase the load range in which the motor can operate without the need for manual intervention for removal or addition of brushes (9).

The proposed solution, therefore, considerably reduces both the cost of parts for assembling the lifting system and the consumption of materials, if compared to those proposed by state-of-the-art lifting systems.

CONCLUSION

As can be inferred from the above description, the brush holder lifting system able to operate as fixed, according to the present invention, overcomes the prior art solutions, being a system of practical use, perfectly susceptible to industrial application, endowed with novelty, involving an inventive act, and resulting in a smaller quantity of parts, less maintenance costs and longer lifetime of the brushes.

What is claimed is:

1. A liftable brush holder system comprising a motor that drives a speed reducer, the speed reducer driving a shaft that moves a disc, wherein the disc is connected to a brush holder comprising sides, and wherein the disc independently moves the sides of the brush holder, each side of the brush holder having a plurality of brushes and a brush support, wherein the brushes abut a slip ring, wherein the disc is connected to a short-circuit bushing, and
wherein the disc has an upper eccentric slot and a lower eccentric slot arranged on opposite sides of the disc and offset by an angle between 160° to 200°.

2. The system of claim 1, wherein when the liftable brush holder is configured to remotely vary the amount of brushes abutting the slip ring.

3. The rotating electric machine of claim 1, wherein the angle is 180°.

4. The system of claim 1, wherein a first side of the brush holder is connected to the upper eccentric slot by an intermediate arm and a second side of the brush holder is connected to the lower eccentric slot of the disc by the intermediate arm.

5. The system of claim 1, wherein each side of the brush holder has bearing units independent of each other.

6. The system of claim 1, wherein an intermediate shaft is connected to the disc and to a movement arm of the short-circuit bushing wherein rotation of the disc sequentially promotes the closing movement of the short-circuit bushing and the lifting of the brushes.

7. The system of claim 1, wherein the brushes arranged in the brush holder are equipped with a stop, so that when the brushes are lifted they abut the brush support and do not remain in contact with the slip ring.

8. The system of claim 1, wherein the short-circuit bushing remains open during operation with the brushes lowered.

9. A rotating electric machine, comprising a liftable brush holder system, the liftable brush holder system comprising a motor that drives a speed reducer, the speed reducer driving a shaft that moves a disc, wherein the disc is connected to a brush holder comprising sides and, wherein the disc independently moves the sides of the brush holder, each side of brush holder having a plurality of brushes and a brush support, wherein the plurality of brushes abut a slip ring, and wherein the disc is connected to a short-circuit bushing (6),
wherein the disc has an upper eccentric slot and a lower eccentric slot arranged on opposite sides of the disc and offset by an angle between 160° to 200°.

10. The rotating electric machine of claim 9, wherein the rotating electric machine is a three-phase alternating current electric motor.

11. The rotating electric machine of claim 9, wherein the liftable brush holder is configured to remotely vary the amount of brushes abutting the slip ring.

12. The rotating electric machine of claim 9, wherein the angle is 180°.

13. The rotating electric machine of claim 9, wherein a first side of the brush holder is connected to the upper eccentric slot by an intermediate arm and a second side of the brush holder is connected to the lower eccentric slot by the intermediate arm.

14. The rotating electric machine of claim 9, wherein each side of the brush holder has bearing units independent of each other.

15. The rotating electric machine of claim 9, wherein an intermediate shaft is connected to the disc and a movement arm of the short-circuit bushing, wherein rotation of the disc sequentially promotes the closing movement of the short-circuit bushing and the lifting of the brushes.

16. The rotating electric machine of claim 9, wherein the brushes arranged in the brush holder are equipped with a stop, so that when the brushes are lifted they abut the brush support and do not remain in contact with the slip ring.

17. The rotating electric machine of claim 9, wherein the short-circuit bushing remains open during operation with the brushes lowered.

* * * * *